US 9,183,674 B2

(12) United States Patent
Diguet (10) Patent No.: US 9,183,674 B2
(45) Date of Patent: Nov. 10, 2015

(54) DESIGNING A THREE-DIMENSIONAL MODELED ASSEMBLY OF OBJECTS IN A THREE-DIMENSIONAL SCENE (75) Inventor: Michaël Diguet, Meudon (FR)

(73) Assignee: Dassault Systèmes, Velizy Villacoublay (FR)

( * ) Notice: Subject to any disclaimer, the term of this patent is extended or adjusted under 35 U.S.C. 154(b) by 531 days.

(21) Appl. No.: 13/461,493

(22) Filed: May 1, 2012

(65) Prior Publication Data
US 2012/0290271 A1 Nov. 15, 2012

(30) Foreign Application Priority Data

May 11, 2011 (EP) ..................................... 11305566

(51) Int. Cl.
G06T 19/20 (2011.01)
G06T 19/00 (2011.01)
G06F 3/0481 (2013.01)
G06F 17/50 (2006.01)

(52) U.S. Cl.
CPC ................. G06T 19/00 (2013.01); G06T 19/20 (2013.01); G06F 3/04815 (2013.01); G06F 17/50 (2013.01); G06F 2217/04 (2013.01); G06F 2217/06 (2013.01)

(58) Field of Classification Search
None
See application file for complete search history.

(56) References Cited

U.S. PATENT DOCUMENTS

| 5,253,189 | A |   | 10/1993 | Kramer |  |
| 5,490,241 | A | * | 2/1996 | Mallgren et al. | 345/440 |
| 5,588,098 | A | * | 12/1996 | Chen et al. | 345/653 |
| 5,666,441 | A | * | 9/1997 | Rao et al. | 382/203 |
| 5,784,063 | A | * | 7/1998 | Nagakura et al. | 345/420 |
| 5,825,365 | A | * | 10/1998 | Hirota et al. | 345/678 |
| 5,831,875 | A | * | 11/1998 | Hirata et al. | 703/7 |
| 5,894,310 | A | * | 4/1999 | Arsenault et al. | 345/679 |
| 6,518,963 | B1 | * | 2/2003 | Waupotitsch et al. | 345/419 |
| 6,801,217 | B2 | * | 10/2004 | Andersson | 345/648 |
| 7,526,359 | B2 | * | 4/2009 | Landers et al. | 700/182 |
| 8,014,985 | B2 | * | 9/2011 | Clavadetscher | 703/6 |
| 8,132,123 | B2 | * | 3/2012 | Schrag et al. | 715/851 |
| 8,379,014 | B2 | * | 2/2013 | Wiedemann et al. | 345/419 |

(Continued)

FOREIGN PATENT DOCUMENTS

EP 1995673 A1 11/2008

OTHER PUBLICATIONS

Y. Wu, S. Sitharama Iyengar, R. Jain, S. Bose, "A New Generalized Computational Framework for Finding Object Orientation using Perspective Trihedral Angle Constraint", pp. 961-975, IEEE 1994.*

(Continued)

Primary Examiner — Kibrom K Gebresilassie
(74) Attorney, Agent, or Firm — Hamilton, Brook, Smith & Reynolds, P.C.

(57) ABSTRACT

The invention is directed to a computer-implemented method for designing a three-dimensional modeled assembly of objects in a three-dimensional scene, wherein the method comprises the steps of: positioning and orienting a predefined set of trihedrals in the three-dimensional scene, each trihedral defining a position and an orientation; providing a set of objects; attaching each object of the set of objects to one corresponding trihedral of the predefined set of trihedrals; and positioning and orienting each object according to the position and the orientation of the corresponding trihedral of the predefined set of trihedrals.

14 Claims, 4 Drawing Sheets

(56) References Cited

U.S. PATENT DOCUMENTS

| | | | |
|---|---|---|---|
| 8,830,229 B2* | 9/2014 | Drost et al. | 345/419 |
| 2006/0106485 A1* | 5/2006 | Landers et al. | 700/182 |
| 2009/0096790 A1* | 4/2009 | Wiedemann et al. | 345/427 |
| 2013/0215114 A1* | 8/2013 | Cherkashin et al. | 345/420 |
| 2014/0327746 A1* | 11/2014 | Dubois et al. | 348/50 |
| 2015/0029181 A1* | 1/2015 | Lerey | 345/419 |

OTHER PUBLICATIONS

Maarten J. G. M, van Emmerik, "Interactive design of 3D models with geometric constraints" pp. 309-325, 1991.*

Y. Wu, S. Iyengar, R. Jain, S. Bose, "A New Generalized Computational Framework for Finding Object Orientation Using Perspective Trihedral Angle Constraint", (herein referred as Wu et al) pp. 961-975, IEEE 1994.*

Y. Wu, S. S. Iyengar, R. Jain, and S. Bose, "Shape From Presepctive Trihedral Angle Constraint", pp. 261-266, 1993 IEEE.*

Y. Wu, S. S. Lyengar, R. Jain, and S. Bose, "A new Generalized Computational Framework for finding Objects Orientation Using Perspective Trihedral Angle Constraint", pp. 961-975, 1994 IEEE.*

Anonymous : "Pattern Features", *Solid Edge Velocity Series—Construction Procedural Features*, pp. 4-1 through 4-41 (Oct. 5, 2010).

Anonymous : "Patterning Features", Part Modeling User's Guide (Jan. 1, 1998).

Sutherland I E Ed—American Federation of Information Processing Societies: "Sketchpad A Man-Machine Graphical Communication System", Proceedings Of The Spring Joint Computer Conference, 23:329-346 (May 1, 1963).

Francisco Albert Gil, et al: "Reconstruction Techniques For Image Analysis Of Ancient Islamic Mosaics", *The International Journal Of Virtual Reality*, 8(3): 5-12 (Sep. 1, 2009).

Sohrt, W., et al., "Interaction With Constraints In 3D Modelling", Proceedings Of The Symposium On Solid Modeling Foundations And CAD/CAM Applications, pp. 387-396 (Jun. 5, 1991).

Jankowski, Gregory, et al: "Solidworks for Dummies, $2^{nd}$ Ed.—Getting Familiar With Mate Types", pp. 128-132 (Nov. 12, 2007).

European Search Report in European Patent Application 11305566.9 dated Mar. 9, 2012.

* cited by examiner

DESIGNING A THREE-DIMENSIONAL MODELED ASSEMBLY OF OBJECTS IN A THREE-DIMENSIONAL SCENE

RELATED APPLICATION(S)

This application claims priority under 35 U.S.C. §119 or 365 to European Patent Application No. 11305566.9, filed May 11, 2011.

The entire teachings of the above application(s) are incorporated herein by reference.

FIELD OF THE INVENTION

The invention relates to the field of computer programs and systems, and more specifically to a method, system and program for designing a three-dimensional modeled assembly of objects in a three-dimensional scene.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

CAD systems provide an intuitive and flexible user interface for designing precise 3D parts, from sketching in an assembly context to iterative detailed design. Such a solution is provided by CATIA Part Design (trademark) application which combines the power of feature-based design with the flexibility of a Boolean approach, offers a highly productive and intuitive design environment with multiple design methodologies, such as post-design and local 3D parameterization.

During the process of parts design, the designer may need to create several identical features from an existing one and to simultaneously position them on a part. To this aim, the designer generally uses two-dimensional patterns that allow to duplicate an original feature at a location chosen in the part by the designer. Common patterns are rectangular pattern and circular pattern. The designer may also need a particular pattern (also referred to as user pattern) that is created by hand by the designer. For instance, the designer selects a set of points in a plane on which the original feature will be duplicated.

During the process of assembly design, the designer may need to create several instances of an existing reference and to simultaneously position them in a three-dimensional scene according to pattern specifications. In this process, the user may want to reuse existing pattern specifications such as a part pattern.

Two approaches are currently used to create a pattern of objects. The first approach is a reuse pattern procedural approach: giving an object A1 and an existing pattern P of objects {B1, B2 . . . Bn}, the user has to position the object A1 relatively to one element of {B1 . . . Bn}. Then a procedure generates and positions the instances {A2 . . . An} of the object A1 according to the specifications of the pattern P (and only according to these specifications).

The second approach is an assembly pattern procedural approach: giving an object A1 and some pattern specifications (for instance, a pattern specification may be 5 instances around an axis with the third instance missing), a procedure generates and position the instances {A2, . . . , An} according to given pattern specifications (and only according to these specifications).

Both described approaches suffer several drawbacks. Firstly, the creation of a three-dimensional pattern is not possible because state of the art technologies only deal with two-dimensional patterns: indeed, the instances of the objects of the pattern assembly are positioned on a plane. Secondly, there is no way to reuse a pattern defined in a reference catalog; current reuse pattern technology requires that the reused pattern and the reusing pattern are in the same three dimensional scene. Therefore, it is not possible to provide to the designer a library of pattern. Thirdly, the known approaches for creating a pattern of objects are based on a procedure that does not permit to respect all the constraints between the objects and other elements (because the procedure is outside the constraints mathematical solver), e.g. two objects of the pattern constrained to be on the same plane. Fourthly, it is not possible to apply external constraints on the specifications of the pattern. For instance, the action consisting on constraining the rotation axis of a circular pattern on another object is not permitted.

Within this context, there is still a need for an improved method for designing a three-dimensional modeled assembly of objects in a three-dimensional scene.

SUMMARY OF THE INVENTION

According to one aspect, the invention therefore provides a computer-implemented method for designing a three-dimensional modeled assembly of objects in a three-dimensional scene, wherein the method comprises the steps of:

positioning and orienting a predefined set of trihedrals in the three-dimensional scene, each trihedral defining a position and an orientation;

providing a set of objects;

attaching each object of the set of objects to one corresponding trihedral of the predefined set of trihedrals;

positioning and orienting each object according to the position and the orientation of the corresponding trihedral of the predefined set of trihedrals.

The method may comprise one or more of the following:

the step of positioning and orienting each object is carried out according to an adjustment matrix $MA_n$ for an $n^{th}$ object of the set attached to its corresponding trihedral;

the adjustment matrix $MA_n$ is defined by the relation $MA_n = (MST_n)^{-1}*O_n$, wherein $MST_n$ is the positioning matrix of a $n^{th}$ trihedral of the set in the 3D scene, $O_n$ is a positioning matrix in the 3D scene of the $n^{th}$ object of the set attached to the $n^{th}$ trihedral of the predefined set of trihedrals;

the adjustment matrix $MA_n$ is identical for each object of the set of objects;

the predefined set of trihedrals is deduced from a pattern of an existing object;

the predefined set of trihedrals is retrieved from a pattern stored in a pattern library;

the step of providing a set of objects comprises:

selecting at least one object;

computing a plurality of instances of the selected at least one object;

the step of attaching each object of the set of objects is carried out according to a link associated with each object of the set;

the step of positioning and orienting the predefined set of trihedrals further comprises applying a constraint on the predefined set of trihedrals;

the step of positioning and orienting the predefined set of trihedrals further comprises applying parameters modifying the relative positions of the trihedrals of the predefined set of trihedrals;

displaying in a graphical user interface the predefined set of trihedrals;

the position and orientation of the predefined set of trihedrals is freely settable in the three-dimensional scene;

the step of positioning and orienting each object is simultaneously solved with constraints.

The invention further proposes a computer program comprising instructions for execution by a computer, the instructions comprising means for performing the above method.

The invention further proposes a computer readable storage medium having recorded thereon the above computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

It is proposed a computer-implemented method for designing a three-dimensional (3D) modeled assembly of objects in a three-dimensional scene. The method comprises a step of positioning and orienting a predefined set of trihedrals in the three-dimensional scene, each trihedral defining a position and an orientation. A trihedral or trihedron is represented by three lines in different planes intersecting in one unique point and defines a frame of reference for designating an object in a space, e.g in a three-dimensional scene. Each trihedral has its own position and orientation that can be defined in relation to a trihedral of the 3D scene: each trihedral of the set has its own coordinates in the 3D scene. The method further comprises a step of providing a set of objects. The set of objects may comprise instances of an object. The method additionally comprises a step of attaching each object of the set of objects to one corresponding trihedral of the set of trihedrals. This attaching step may be an automatically carried out, or performed upon user action. Attaching means that a pair comprised of an object and a trihedral is created. The creation of the pair may rely on a relation described in the object or the trihedral or the system. The method further comprises a step of positioning and orienting each object according to the position and the orientation of the corresponding trihedral of the set of trihedrals. The objects are thus positioned and oriented in the 3D scene so that they form a 3D modeled assembly.

Such a method improves the designing of a 3D modeled assembly of objects because the specifications of the pattern are instantiated in the 3D scene, which means that the set of trihedral defining the instantiated specifications of the pattern are in the 3D scene. In other terms, the set of trihedrals forms the instantiated specifications of the pattern in the 3D scene. Advantageously, the pattern is not limited to a two-dimensional plan and the assembly of modeled object can therefore extend in all the directions of the 3D space. Moreover, the position and the orientation of the objects in relation to the pattern can be performed according to constraints between the provided objects. These constraints are also called intrinsic constraints. Furthermore, the position and the orientation of the objects in relation to the pattern can be performed according to constraints between the objects of the set and an element that does not belong to the 3D modeled assembly of objects. In addition, the instantiated specifications of the pattern can be constrained with constraints—also called extrinsic constraints—that are applied on the set of trihedrals. Therefore, the designing of the 3D modeled assembly is highly facilitated inasmuch as the pattern is freely settable. Furthermore, patterns can be reused because a former pattern can be adapted to a new object. Indeed, the set of trihedral defining the initiated specifications of the pattern is independent of the other objects in the 3D scene. This advantageously allows the creation of libraries of reusable patterns. Besides, the method according to the invention does not rely on a procedural approach: the modeled assembly comprising the pattern and the objects can be solved in a row together with constraints by a numerical solver.

The method is computer-implemented. This means that the steps (or substantially all the steps) of the method are executed by at least one computer. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of providing a set of 3D modeled objects can be performed upon user selection of objects.

A typical example of computer-implementation of the method is to perform the method with a system comprising a graphical user interface (GUI) suitable for this purpose. The GUI is coupled with a memory and a processor. The memory, which stores a database, is merely any hardware suitable for such storage.

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the database may store a set of patterns, thus forming a pattern library that can be queried. The database may also store the provided set of objects.

The method generally manipulates modeled objects. A modeled object is any object defined by data stored in the database. By extension, the expression "modeled object" designates the data itself. According to the type of the system, the modeled objects may be defined by different kinds of data. The system may indeed be any combination of a CAD system, a CAE system, a CAM system, and/or a PLM system.

In those different systems, modeled objects are defined by corresponding data. One may accordingly speak of CAD object, PLM object, CAE object, CAM object, CAD data, PLM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is meant any system suitable at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system suitable for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

By CAE system, it is meant any system suitable for the analysis of the physical behaviour of a modeled object. In a CAE system, a modeled object is thus defined by data suitable for the analysis of such behaviour. This may be typically a set of behavioring features. For instance, a modeled object corresponding to a door may be defined by data indicating that the door rotates around an axis.

Figure 2:
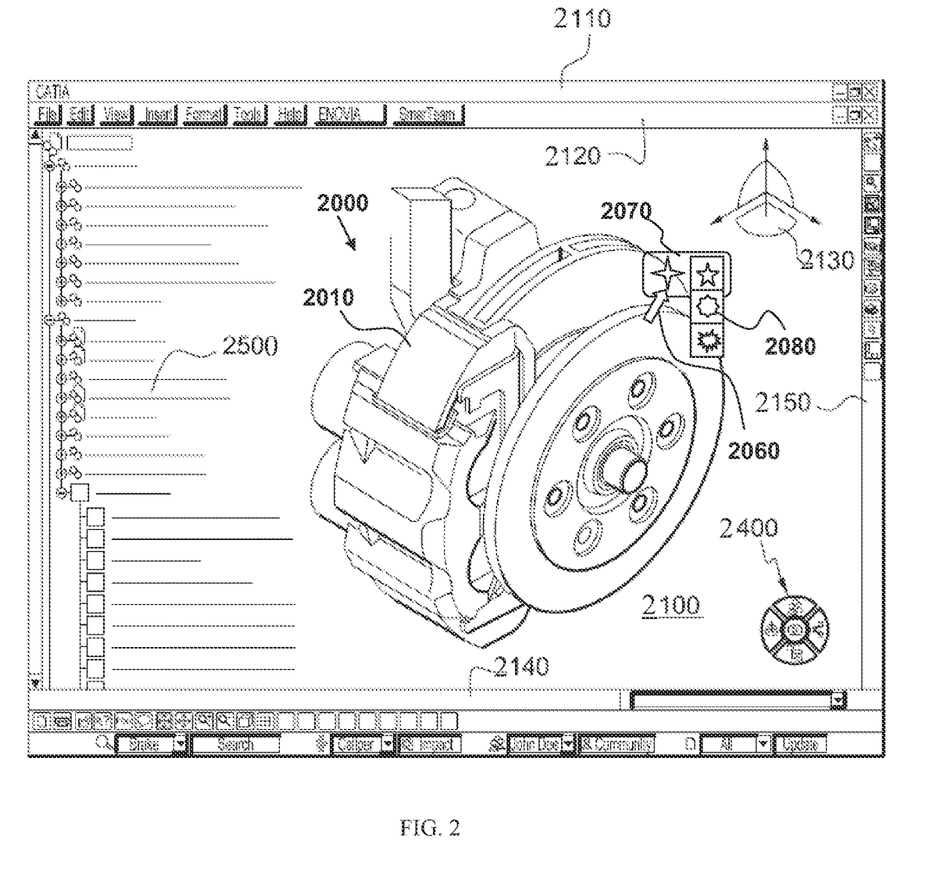
FIG. 2 shows an example of a graphical user interface.

FIG. 2 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
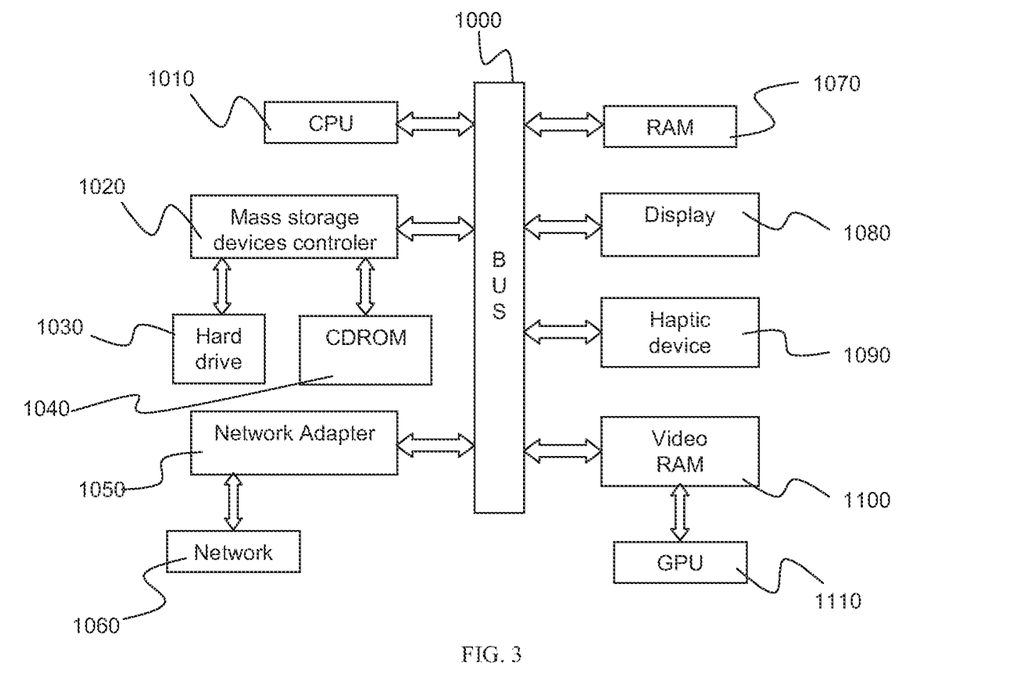
FIG. 3 shows an example of a client computer system.

FIG. 3 shows a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080, as mentioned with reference to FIG. 2. In addition, the cursor control device allows the user to select various commands, and input control signals. The cursor control device includes a number of signal generation devices for input control signals to system. Typically, a cursor control device may be a mouse, the button of the mouse being used to generate the signals.

A computer program may comprise instructions by a computer, the instructions comprising means for causing the above system to perform the above method. The invention may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language or in assembly or machine language if desired; and in any case, the language may be a compiled or interpreted language.

Figure 1:
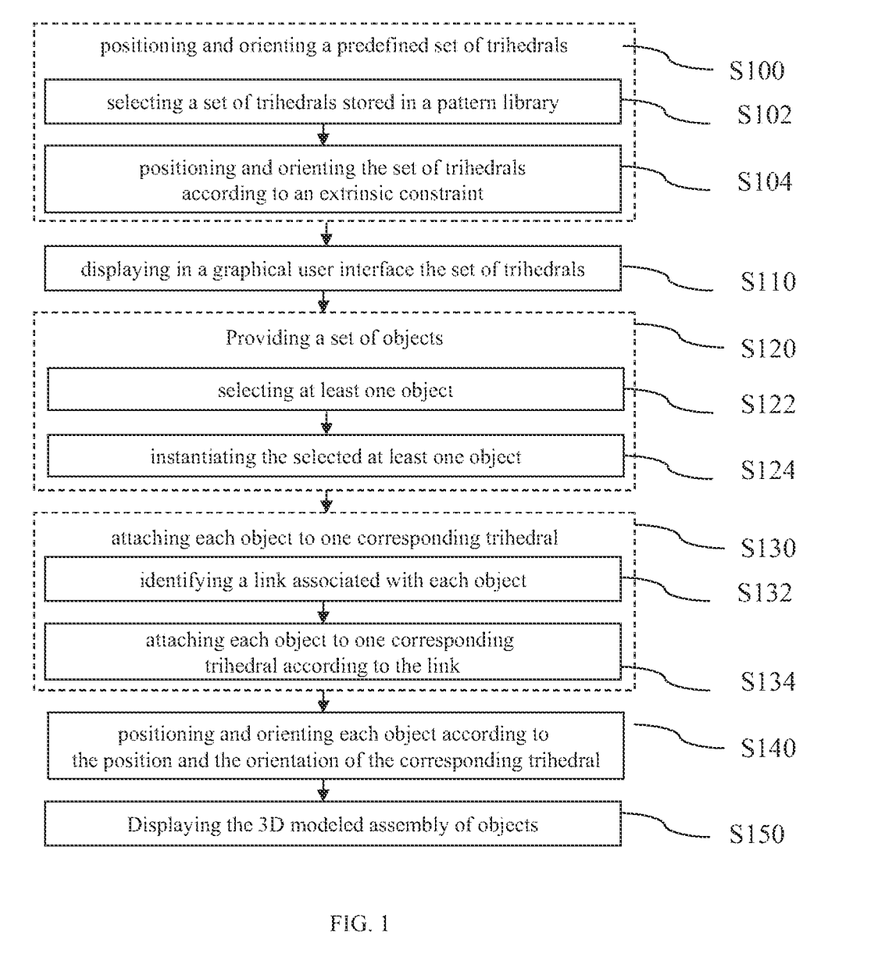
FIG. 1 shows a flowchart of an example of the method.
Figure 6:
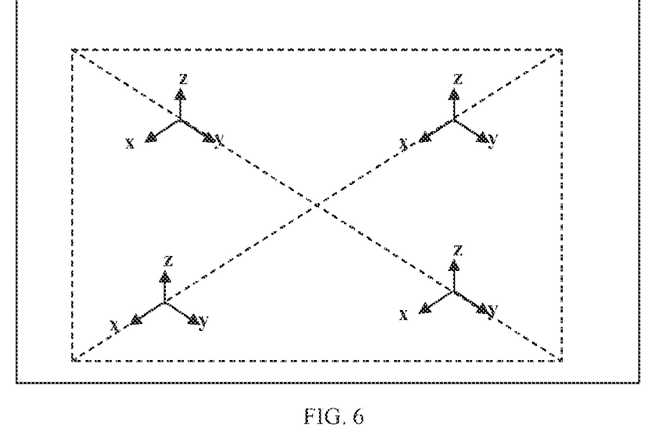
FIG. 6 shows the predefined set of trihedrals of FIG. 4 having new positions and orientations.

Referring now to FIG. 1, a flowchart of an example of the method is depicted. At step S100, a predefined set of trihedrals is positioned and oriented in a three dimensional scene, as the one represented on FIG. 6. The 3D scene is a space in which spatial relationships between objects are described. These spatial relationships are determined according to a trihedral proper to the 3D scene also called frame of reference of the 3D scene. This trihedral proper to the 3D scene provides the necessary elements for designating an object (e.g. a point) in the 3D scene. The 3D scene is thus oriented.

Each trihedral may be characterized by six real numbers that are part of a positioning matrix, three real numbers characterizing translation values and the three other numbers characterizing rotation values. The specification of the pattern can therefore be easily stored. For instance, a set of trihedrals comprising four trihedrals can be stored under the form of 4*6 real numbers. Each trihedral may be represented by a n*n positioning matrix, as known in the art. For instance, a 4*4 positioning matrix may be noted $$\begin{bmatrix} a & b & c & x \\ d & e & f & y \\ g & h & i & z \\ 0 & 0 & 0 & 1 \end{bmatrix}$$

wherein (x, y, z) represents the vector of translation of the trihedral in the 3D scene, the terms (a, b, c), (d, e, f), and (g, h, i) represent the matrix of rotation of the trihedral in the 3D scene that provides the angular position of the trihedral relative to the frame of reference of the 3D scene. The last line of the matrix is always represented by the terms (0, 0, 0, 1) and is used for obtaining a 4*4 matrix (a square matrix) so that matrix inversion computing is allowed.

Each trihedral defines a position and an orientation in the 3D scene characterized by a positioning matrix noted $MST_n$, n representing the $n^{th}$ trihedral of the set). The position of each trihedral in the 3D scene means the position of the origin of the trihedral in the 3D scene determined in relation to the proper trihedral of the 3D scene, that is, the frame of reference of the 3D scene. The orientation of each trihedral describes how the trihedral is placed in the 3D scene. The orientation describes the rotation that is needed to move the trihedral from a reference placement its current placement. Therefore, each trihedral has a position and an orientation that together fully describe how the trihedral is placed in the 3D scene. It is to be understood that the position and the orientation of an object in the 3D scene is similarly defined.

The set of trihedrals forms the instantiated specifications of a pattern in the 3D scene, which amounts to say that the set of trihedrals constitutes an instance of the pattern in the 3D scene. Advantageously, the instantiated specifications of the pattern represented by the set of trihedrals are positioned in the 3D space, which means that the pattern open the possibility to use the three dimensions (also referred to as length, width, and depth).

The set of trihedrals may be also characterized by a n*n positioning matrix, e.g. a 4*4 square matrix. The positioning matrix of the set of trihedral may be noted G. The position of each trihedral of the set of trihedrals in the 3D scene may be obtained by computing the following matrix multiplication: $MST_n = G*MGT_n$, wherein $MGT_n$ is the positioning matrix of the trihedral in the 3D frame of the pattern (or in the 3D frame of the specifications) and n represents the $n^{th}$ trihedral of the set. This means that the position and the orientation of the trihedral may be determined relative to the frame of reference of the pattern.

The set of trihedrals is predefined, which means that the position and orientation of the trihedrals are already decided. In other words, when the predefined set of trihedrals is loaded in the system, the position and orientation of the trihedrals are known. The predefined set of trihedrals is however freely settable in the three-dimensional scene. Freely settable means is it possible to modify the position and the orientation of at least one trihedral, e.g. upon user action. In addition, constraints between trihedrals of the set can be applied. For instance, a minimum distance between the trihedrals of the set can be forced. This can be performed thanks to the specifications of the pattern that can be parameterized: this means that the relative positions of the trihedrals of the set may depend on at least one parameter. Thus, parameters may be applied for modifying the relative positions of the trihedrals of the predefined set of trihedrals.

The predefined set of trihedrals may be obtained upon selection of a pattern stored in a pattern library (S102). The selection of the pattern can be performed as known in the art.

For instance, this may be done thanks to the use of a tree showing lists of patterns, such as the one 2500 of FIG. 2. It is also possible for the user to select the pattern thanks to another type of user interface, for instance by inputting identification information for the pattern, by selecting the pattern in a list, or the like. The pattern may be selected thanks to any kind of user interface such as a combo-box, an icon, a special command, and so on. The pattern library may be stored on a database. The selection of a pattern involves that specifications of the pattern are selected; especially, how the objects forming the assembly are placed in the 3D scene. The selection of the pattern therefore comes with the instantiated specifications of the pattern, that is, the predefined set of trihedrals is computed from the instantiated specifications of the selected pattern. Instantiating specifications of the pattern amounts to say that the set of trihedrals is into a 3D space (e.g. the 3D scene), that is, a position and an orientation is given to each trihedral of the set. It is to be understood that each trihedral of the set has a position and an orientation relative to the frame of reference of the pattern (or frame of the specifications).

The predefined set of trihedrals may be deduced from a pattern of an existing object, e.g. an assembly of objects. In practice, the existing object is selected by the user. The selection of the pattern can be performed as for the pattern. Once the object is selected, characteristics of the object are extracted upon computation. To this aims, information stored in the object may be exploited, e.g. the pattern design stored within the object. For instance, an assembly of object obtained from a rectangular pattern may comprise information such as a number of lines and columns, the direction of the lines and columns, the spacing between objects on the pattern, and so on. As a result of the extraction, specifications of a pattern are obtained. When the set of trihedrals is deduced from an existing pattern or obtained from a pattern, the respective position and orientation of the trihedral of the set may be determined from the frame of reference of the pattern.

Optionally, as shown on step S104, the position and the orientation of the predefined set of trihedrals may be constrained.

This means that a constraint is applied on the whole set of trihedrals. In other terms, a constraint—also called extrinsic constraint—is applied on the instantiated specifications of the pattern. In practice, a symmetry constraint is applied on the set of trihedrals, which means that the constraint is applied on a point of symmetry or an axis of symmetry of the set of trihedrals. In other terms, a virtual geometry may be added to the set trihedral in the 3D scene, and this virtual geometry (e.g. point of symmetry, axis of symmetry) is constrained. For instance, a circular pattern allows the user to specify total angle, angular spacing, and distance of features in relation to a circular rotation axis. Thanks to the method according the invention, it is possible to apply a constraint on the circular rotation axis so that the complete set of trihedrals is constrained.

A constraint—e.g. a geometric constraint—limits the way different objects can move in relation to other objects and how they can affect them. Constraints are widely used in modeling of mechanical parts. The constraints may concern the relations between the 3D modeled objects, and may also concern the relations between the trihedrals and de 3D modeled objects. Alternatively, constraints may be associated with at least one trihedral of the set. It has to be understood that a constraint may be stored with a 3D modeled object, the constraint being part of the file of the 3D modeled object, or it may be stored with the trihedral, the constraint being part of specification of the trihedral.

Optionally, the position and the orientation of the predefined set of trihedrals may be constrained in accordance with at least one element of the 3D scene. An element may be any object in the 3D scene that is not part of the assembly of object or excluded of the assembly of object.

Then, at step S110, the set of trihedrals is displayed to the user, e.g. on a computer screen. It is to be understood that the displaying step may be earlier; for instance, if the user places the trihedrals in the 3D space for forming the predefined set of trihedrals or if the user wants to directly modify the position and/or orientation of a trihedral by interacting with a cursor on the trihedral.

Figure 4:
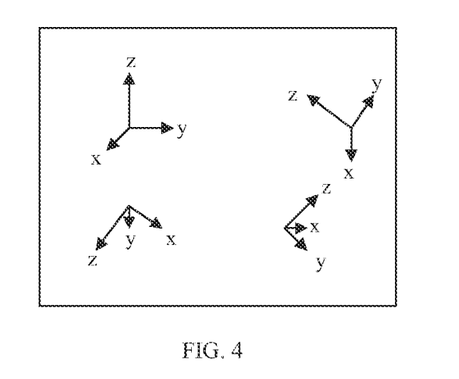
FIG. 4 shows an example of a predefined set of trihedrals positioned and oriented in a 3D scene.

Referring now to FIG. 4, a set of trihedrals is displayed to the user. Each trihedral has a position and an orientation in the 3D scene—the reference pattern of the 3D scene is not represented- and defines a position and an orientation in the 3D space. Each trihedral is a frame of reference referring to set of axes (X, Y, Z) within which the position, orientation, and other properties of an objects can be characterized. Each trihedral thus provides a coordinate system.

Referring back to the flowchart depicted on FIG. 1, a set of objects is then provided (S120) to the system performing the method, e.g. a CAD system. An object may be for instance a 3D modeled object designed with a CAD system. Providing an object means that the object is available for the CAD system that can perform operation on it, e.g. the object in stored in memory. Preferably, the number of objects provided equals the number of trihedral in the 3D scene.

In practice, the step of providing a set of objects comprises a first sub-step of selecting at least one object (S122) and a second sub-step of instantiating the selected at least one object (S124). The selection of an object can be performed the same way that for the selection of the pattern, e.g. upon user action in a list of objects. The selection of an object may also be automatically performed by the system. The selected object is then instantiated several times in order to create a set of objects. The instantiation of an object is well known in the field of computerized process. The instantiation creates an instance by defining one particular variation of the selected object. Typically, the selected object is a file comprising data representing a modeled object, and the instantiated object is an executable file that can be processed by a CAD system. The instantiated objects are thus stored in memory and can be accessed and used by the CAD system.

Figure 5:
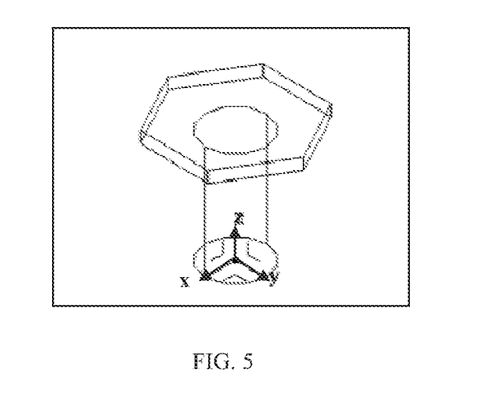
FIG. 5 shows an example of an oriented object.

Referring now to FIG. 5, a 3D modeled object selected by a user is represented in a 3D scene. The 3D modeled object comprises a trihedral defining a position and orientation for each point of the 3D modeled object. The 3D modeled object may be displayed on a graphical user interface (not represented).

Each object of the set has a position in the 3D scene that may be characterized by a positioning matrix, typically a 4*4 positioning matrix as previously described. The positioning matrix of an object may be noted $O_n$, n representing the $n^{th}$ object of the set).

Next, at step S130, each object of the set of objects is attached to one corresponding trihedral of the set of trihedrals. This means that a pair of objects comprised of an object of the set and a trihedral is created. In other words, a set of couples (object, trihedral) is created.

The attaching step may be carried out by identifying an link associated with each object of the set (S132): each object of the set can thus access a respective link that enables the object to identify the corresponding trihedral. In practice, the link is accessed by each object through a dedicated object which is called "link object". This "link object" comprises a table wherein a correspondence between an object and a trihedral is maintained. In other terms, the "link object" identifies the set of couples (object, trihedral). It is to be understood that the links may be stored in any collection of data organized for search and retrieval.

In alternative, a link may be stored with the object, e.g. under the form of a label. One can also contemplate that the link may be stored with each trihedral. Advantageously, the identified link makes it possible to select a specific trihedral among the set of trihedrals when several different 3D modeled objects need to be attached. This allows to create a 3D modeled assembly of objects with several different 3D modeled objects.

Then, once a link has been identified for each object of the set (S134), the objects are attached to their corresponding trihedral according to the identified link. The set of couples (object, trihedral) are now created.

After the step of attaching (S130), a step of positioning and orienting (S140) each object according to the position and the orientation of the corresponding trihedral of the set of trihedrals is carried out. The 3D modeled objects are thus placed in the 3D scene so that their respective position and orientation reflect the position and the orientation of the trihedral to which each 3D modeled object is attached. As a result, an assembly of objects is built from a set of specifications forming a pattern, the set of specifications being instantiated in the 3D scene and characterized by the set of trihedrals. This advantageously allows to create a three-dimensional assembly of objects according to a three-dimensional pattern instantiated in a three-dimensional scene, without requiring a procedural approach. Indeed, the pattern obtained according to the invention is a variational pattern (and not a procedural one) and therefore allows to solve simultaneously by a numerical solver a network of geometrical constraints (e.g. intrinsic and extrinsic constraints) and an assembly pattern. This will be more apparent in the following.

Typically, the position and orientation of each object according to the position and the orientation of its corresponding trihedral is carried out with a constraint applied on each object: for a given couple (object, trihedral), transformation matrices between the object and the trihedral are the same. A transformation matrix transforms a vector from one reference frame to another. As a result, there exists a matrix called adjustment matrix and noted $MA_n$ that allows positioning and orienting an $n^{th}$ object of the set to its corresponding trihedral according to the position of its corresponding trihedral. An $n^{th}$ object of the set is one of the objects among the objects of the set. In other terms, there exists a relation between the respective positioning matrices of the object and the trihedral forming a couple, and this relation is exploited for constraining the positioning and orienting of each object. This amounts to say that a constraint is applied to each object at the positioning and orienting step, the constraint being specified by the adjustment matrix $MA_n$.

In practice, the adjustment matrix $MA_n$ may be defined by the relation $$MA_n = (MST_n)^{-1} * O_n,$$

wherein $MST_n$ is positioning matrix of each trihedral of the set of trihedrals in the 3D scene, On is the positioning matrix of each object of the set in the 3D scene, and n represents the $n^{th}$ trihedral of the set.

This leads another relation wherein the adjustment matrix $MA_n$ may be defined by $MA_n = (G*MGT_n)^{-1} * O_n$, wherein G is the positioning matrix of the set of trihedrals, $MGT_n$ is the positioning matrix of the trihedral in the 3D frame of the pattern (or in the 3D frame of the specifications), $O_n$ is the positioning matrix of each object of the set in the 3D scene, n representing the $n^{th}$ trihedral of the set.

Therefore, it is possible to determine the positioning matrix of an object with the relation $O_n = MST_n * MA_n = G * MGT_n * MA_n$. As a result, it is possible to compute the position and orientation of an object in the 3D scene by multiplying the adjustment matrix to the positioning matrix of its corresponding trihedral in the 3D scene.

In practice, the adjustment matrix is identical for each object of the set. In other words, for each object p and n, $MA_p = MA_n$. Advantageously, this allows to simultaneously position a set of object in conformity with a specification of a pattern.

In alternative, the adjustment matrix may be adapted for at least one object. This amounts to say that a particular constraint is applied to a particular object so that the result of the result of the step of positioning and orienting the object differs. This allows to adapt the position and orientation of at least one object of the set, therefore increasing the number different assemblies of pattern that can be designed.

In practice, this is performed by modifying the adjustment matrix of this at least one object by multiplying the common adjustment matrix $MA_n$ with a modified identity matrix, noted In. An identity matrix noted I of size n is the n×n square matrix with ones on the main diagonal and zeros elsewhere, e.g. a 4*4 identity matrix. A modified identity matrix In is an identity matrix wherein the identity of the said at least one object is modified (that is, the identity is not equal to one). Thus, the modified identity matrix changes the adjustment matrix of the said at least one object when multiplied with the adjustment matrix. And on the contrary, the modified identity leaves unchanged the adjustment matrix of the others objects of the set modified (that is, the identity is equal to one).

Thus, the positioning matrix of an object is determined with the relation $On = MSTn*MAn*In = G*MGTn*MAn*In$, wherein In is the modified identity matrix such that $In \neq I$ for at least one object to be positioned and orientated differently.

Thus, the designing of the 3D modeled assembly of objects does not depend on a procedural approach: the positions and orientations of each object are obtained with a one-shot computating. All the mathematical constraints can be directly transmitted (or injected) to a numerical solver which is able to find a result to the global problem if a solution to this problem exists. In the event the solver is not able to calculate a solution, then the solver sends a message indicating that the problem is over-constrained.

In additions, all the constraints relative to the design assembly can be solved while computing the positions and orientations of each object inasmuch as the systems has a global view of the assembly to compute; for instance, the intrinsic and extrinsic constraints, the constraints between the objects of the assembly and at least one element of the 3D scene, constraints between trihedrals of the set can be solved in the same time than the position and orientation of each object. Thus, the pattern of objects and geometrical constraints are treated in the same time. More generally, the solver computes a solution for all the constraints of positioning and orienting the assembly and the supplementary constraints applied on the specifications of the pattern and the objects. The position and orientation of each object is thus simultaneously solved with constraints, the constraints being related to the 3D modeled assembly of object to be designed.

Figure 7:
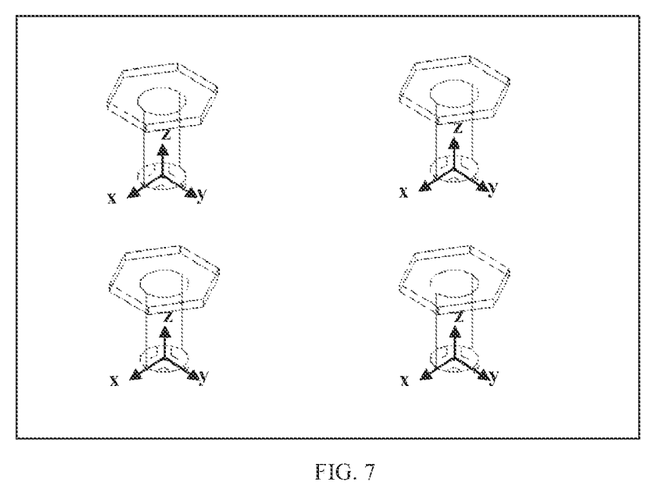
FIG. 7 shows an example of a 3D modeled assembly of objects designed according to the method of the invention.

Then, at step S150, the 3D modeled assembly is computed and displayed in the 3D scene. Alternatively, the 3D modeled assembly of objects may be displayed together with set of trihedrals, as represented on FIG. 7.

The preferred embodiment of the present invention has been described. It will be understood that various modifications may be made without departing from the spirit and scope of the invention. Therefore, other implementations are within the scope of the following claims. For instance, the position and the orientation of at least one trihedral of the predefined set may be modified, for instance upon user action. The modification may be performed by inputting new specifications values. The modification may also be directly performed on the trihedral displayed, e.g. by interacting with a cursor on the trihedral. Thus, the user can adapt the position and orientation of each trihedral in the 3D scene.

The invention claimed is:

1. A computer-implemented method for designing a three-dimensional modeled assembly of objects in a three-dimensional scene, comprising:
by a processor and associated memory:
positioning and orienting a predefined set of trihedrals in the three-dimensional scene, each trihedral defining a position and an orientation;
providing a set of objects;
attaching each object of the set of objects to one corresponding trihedral of the predefined set of trihedrals; and
positioning and orienting each object in the three-dimensional scene according to the position and the orientation of the corresponding trihedral of the predefined set of trihedrals, resulting in a three-dimensional modeled assembly of the set of objects in the 3-D scene;
wherein the step of positioning and orienting each object is carried out according to an adjustment matrix $MA_n$ for an nth object of the set attached to its corresponding trihedral; and
wherein the adjustment matrix $MA_n$ is defined by the relation $MA_n = (MST_n)^{-1} * O_n$, wherein $MST_n$ is the positioning matrix of a nth trihedral of the set in the 3D scene, $O_n$ is a positioning matrix in the 3D scene of the nth object of the set attached to the nth trihedral of the predefined set of trihedrals.

2. The computer-implemented method of claim 1, wherein the adjustment matrix $MA_n$ is identical for each object of the set of objects.

3. The computer-implemented method of claim 1, wherein the predefined set of trihedrals is deduced from a pattern of an existing object.

4. The computer-implemented method of claim 1, wherein the predefined set of trihedrals is retrieved from a pattern stored in a pattern library.

5. The computer-implemented method of claim 1, wherein the step of providing a set of objects comprises:
selecting at least one object; and
computing a plurality of instances of the selected at least one object.

6. The computer-implemented method of claim 1, wherein the step of attaching each object of the set of objects is carried out according to a link associated with each object of the set.

7. The computer-implemented method of claim 1, wherein the step of positioning and orienting the predefined set of trihedrals further comprises applying a constraint on the predefined set of trihedrals.

8. The computer-implemented method of claim 1, wherein the step of positioning and orienting the predefined set of trihedrals further comprises applying parameters modifying the relative positions of the trihedrals of the predefined set of trihedrals.

9. The computer-implemented method of claim 1, further comprising a step of:
displaying in a graphical user interface the predefined set of trihedrals.

10. The computer-implemented method of claim 1, wherein the position and orientation of the predefined set of trihedrals is freely settable in the three-dimensional scene.

11. The computer-implemented method of claim 1, wherein the step of positioning and orienting each object is simultaneously solved with constraints.

12. A non-transitory computer readable storage medium comprising:
recorded computer program instructions forming a computer program on the storage medium for designing a three-dimensional modeled assembly of objects in a three-dimensional scene;
the computer program comprising instructions for execution by a computer, the instructions being adapted for causing the computer to:
position and orientate a predefined set of trihedrals in the three-dimensional scene, each trihedral defining a position and an orientation;
provide a set of objects;
attach each object of the set of objects to one corresponding trihedral of the predefined set of trihedrals; and
position and orientate each object in the 3-D scene according to the position and the orientation of the corresponding trihedral of the predefined set of trihedrals, resulting in a 3-D modeled assembly of the set of objects in the 3-D scene;
wherein the positioning and orienting each object is carried out according to an adjustment matrix $MA_n$ for an nth object of the set attached to its corresponding trihedral; and
wherein the adjustment matrix $MA_n$ is defined by the relation $MA_n = (MST_n)^{-1} * O_n$, wherein $MST_n$ is the positioning matrix of a nth trihedral of the set in the 3D scene, $O_n$ is a positioning matrix in the 3D scene of the nth object of the set attached to the nth trihedral of the predefined set of trihedrals.

13. The non-transitory computer readable storage medium of claim 12, wherein the position and orientation of the predefined set of trihedrals is freely settable in the three-dimensional scene.

14. The non-transitory computer readable storage medium of claim 12, wherein the computer positioning and orienting each object simultaneously solves constraints.

* * * * *